UNITED STATES PATENT OFFICE.

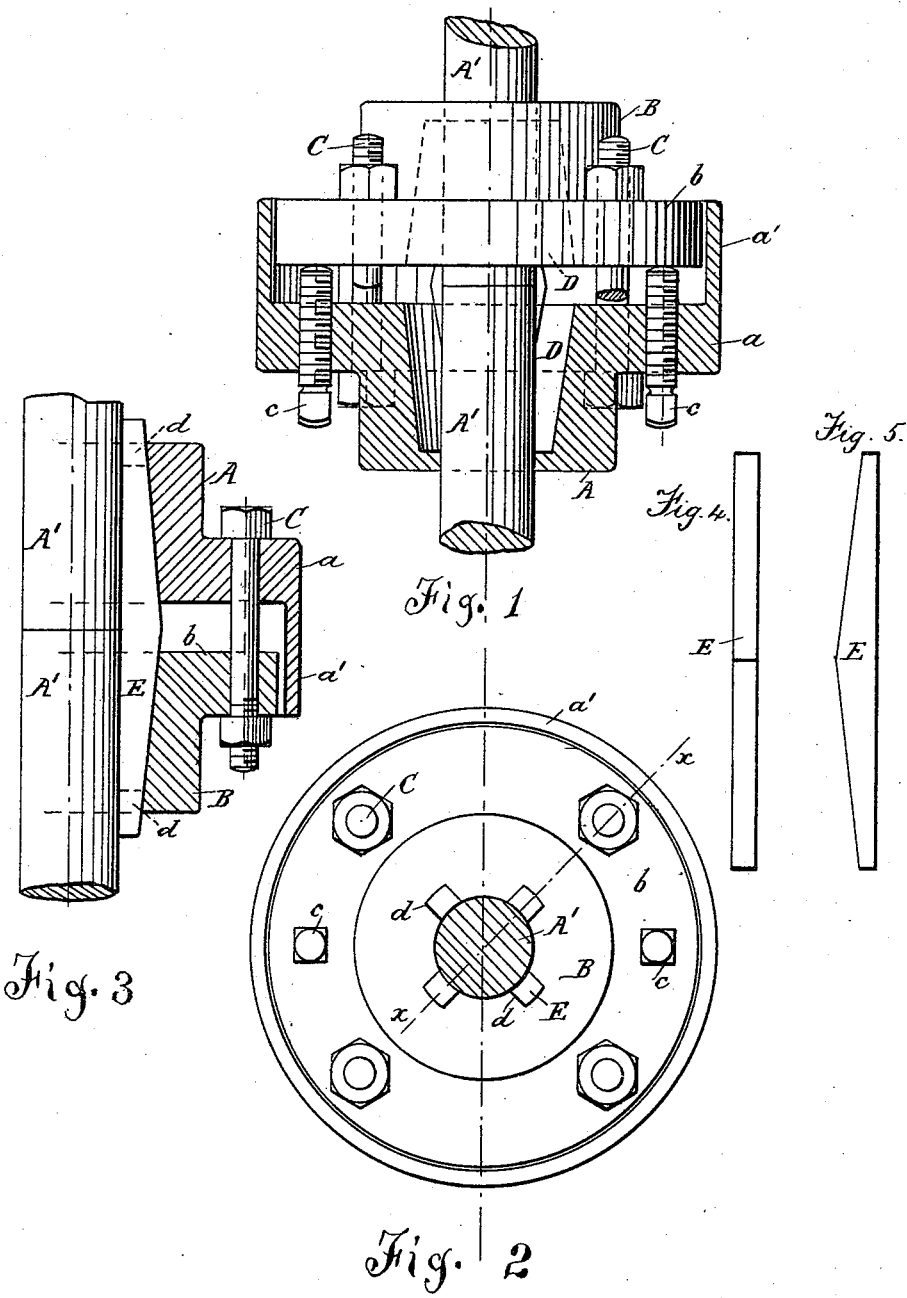

WILLIAM H. NICHOLSON, OF WILKES-BARRÉ, PENNSYLVANIA.

SHAFT-COUPLING.

SPECIFICATION forming part of Letters Patent No. 443,627, dated December 30, 1890.

Application filed June 28, 1890. Serial No. 357,023. (No model.)

*To all whom it may concern:*

Be it known that I, WILLIAM H. NICHOLSON, a citizen of the United States, residing at Wilkes-Barré, in the county of Luzerne and State of Pennsylvania, have invented certain new and useful Improvements in Shaft-Couplings; and I do hereby declare the following to be a full, clear, and exact description of the invention, such as will enable others skilled in the art to which it appertains to make and use the same.

This invention relates to shaft-couplings; and it consists in the novel construction and combination of the parts hereinafter fully described and claimed.

In the drawings, Figure 1 is a side view of the coupling, showing one-half of it in section. Fig. 2 is an end view of the coupling. Fig. 3 is a part longitudinal section through the coupling, taken on line $x\ x$ in Fig. 2. Figs. 4 and 5 are respectively a plan and a side view of one of the coupling-keys.

The coupling consists of two hubs A and B, fitting over the ends of the shafts A' and provided with flanges $a$ and $b$.

C are bolts which pass through holes in the flanges $a$ and $b$ for securing the two hubs together and clamping them upon the ends of the shafts. The flange $a$ is provided with a ring $a'$, which projects over the flange $b$, so as to hide the opening between the flanges and prevent dirt from getting into the coupling. Set-screws $c$ are provided for forcing the two flanges apart when the shafts are to be uncoupled. These set-screws engage with screw-threaded holes in flange $a$ and bear against the inner face of the flange $b$. Each hub is provided with a circular tapering chamber D and with equidistant slots $d$ at the smaller end of each chamber at the opposite ends of the hubs.

E are double tapered keys, the ends of which pass through the slots $d$. The tapered surfaces of the keys bear against the tapered sides of the chambers D, so that when the halves of the coupling are drawn together by the bolts the keys are pressed hard against the shafts and are kept at a uniform distance apart by the metal between the slots $d$. Any desired number of keys may be used, according to the diameter of the shafts to be coupled. Four are shown in the drawings, which represent the coupling applied to the ends of two comparatively small shafts.

What I claim is—

1. A shaft-coupling consisting of two flanged hubs provided with similar tapering chambers having a series of narrow slots at their smaller ends, the double tapered keys inserted in the said chambers and slots, and the bolts passing through the hub-flanges for drawing the halves of the coupling together, substantially as set forth.

2. In a shaft-coupling, the combination, with the two hubs provided with flanges, one of which has a ring projecting over the other flange and both hubs having similar tapering chambers and equidistant slots at the smaller ends of the chambers, of the double tapered keys inserted in the said chambers and slots, and the clamping-bolts passing through the said flanges, substantially as and for the purpose set forth.

In testimony whereof I affix my signature in presence of two witnesses.

WILLIAM H. NICHOLSON.

Witnesses:
   S. T. NICHOLSON,
   WILLIAM NICHOLSON, Jr.